(12) United States Patent
Kaseva (10) Patent No.: US 10,750,341 B2
(45) Date of Patent: Aug. 18, 2020

(54) SYSTEM FOR CONNECTING A BEACON DEVICE AND A GATEWAY DEVICE

(71) Applicant: WIREPAS OY, Tampere (FI)

(72) Inventor: Ville Kaseva, Tampere (FI)

(73) Assignee: WIREPAS OY, Tampere (FI)

( * ) Notice: Subject to any disclaimer, the term of this patent is extended or adjusted under 35 U.S.C. 154(b) by 1 day.

(21) Appl. No.: 15/999,821

(22) PCT Filed: Feb. 15, 2017

(86) PCT No.: PCT/FI2017/050093
§ 371 (c)(1),
(2) Date: Aug. 20, 2018

(87) PCT Pub. No.: WO2017/140950
PCT Pub. Date: Aug. 24, 2017

(65) Prior Publication Data
US 2019/0364407 A1   Nov. 28, 2019

(30) Foreign Application Priority Data
Feb. 18, 2016   (FI) ..................................... 20165121

(51) Int. Cl.
*H04W 4/80* (2018.01)
*H04W 84/18* (2009.01)
*H04W 88/04* (2009.01)

(52) U.S. Cl.
CPC .............. *H04W 4/80* (2018.02); *H04W 84/18* (2013.01); *H04W 88/04* (2013.01)

(58) Field of Classification Search
CPC ........ H04W 4/80; H04W 88/04; H04W 84/18
See application file for complete search history.

(56) References Cited

U.S. PATENT DOCUMENTS

| 8,116,295 | B2 * | 2/2012 | Reumerman | ......... H04W 40/24 |
| | | | | 370/348 |
| 9,363,006 | B2 * | 6/2016 | Bhargava | ............... H04W 48/20 |
| 2006/0274704 | A1 * | 12/2006 | Desai | ................ H04W 72/1215 |
| | | | | 370/338 |

(Continued)

FOREIGN PATENT DOCUMENTS

| EP | 2733502 | 5/2014 |
| EP | 2 999 297 | 3/2016 |

(Continued)

OTHER PUBLICATIONS

International Search Report, PCTFI2017/050093, May 2, 2017.

(Continued)

*Primary Examiner* — Curtis A Alia
(74) *Attorney, Agent, or Firm* — Young & Thompson (57) ABSTRACT

Disclosed is a system for connecting a beacon device and a gateway device. The system includes beacon devices and the gateway device. The beacon device belonging to the beacon devices is adapted to provide a bi-directional connection to the GW device and the GW device is adapted to provide a bi-directional connection to an application system. The beacon devices form a multi-hop wireless mesh network, the GW device provides a bi-directional mesh connection to the wireless mesh network, and the wireless mesh network is used for communicating data between the beacon device and the GW device.

9 Claims, 5 Drawing Sheets

(56) References Cited

U.S. PATENT DOCUMENTS

| | | |
|---|---|---|
| 2014/0370917 A1 | 12/2014 | Buchheim et al. |
| 2015/0147067 A1 | 5/2015 | Ryan et al. |
| 2015/0369618 A1 | 12/2015 | Barnard et al. |
| 2016/0086424 A1 | 3/2016 | Polo et al. |
| 2018/0132102 A1* | 5/2018 | Kwon ............... H04W 28/0215 |

FOREIGN PATENT DOCUMENTS

| | | |
|---|---|---|
| WO | WO 2009/116682 | 9/2009 |
| WO | WO 2016/012612 | 1/2016 |

OTHER PUBLICATIONS

Written Opinion, PCT/FR2017/050093, May 2, 2017.
Ubudu, "uBeacon Mesh, the next-generation beacon", [online], pp. 1-6, [retrieved on Sep. 2, 2016]. Retrieved from the Internet;<http;//shop.ubudu.com/>[available on online server on Oct. 25, 2015; https://web.archive.org/web/20151025031017http://shop.ubudu.com/] pp. 1-3, 5.
Finnish Search Report, 20165121, dated Sep. 7, 2016.

* cited by examiner

SYSTEM FOR CONNECTING A BEACON DEVICE AND A GATEWAY DEVICE

TECHNICAL FIELD

The application relates generally to a system for connecting a beacon device and a gateway device.

BACKGROUND

Beacons are small, low cost, usually battery-operated, wireless devices emitting advertisement broadcast frames e.g. using Bluetooth Low Energy (BLE) protocol. The advertisement messages of the beacon devices can be received by a mobile device, such as a smartphone or a tablet, or other device that supports the specified protocol. Today, there are few different beacon protocols defined, such as iBeacon, UriBeacon, and Eddystone for example. All of them use the BLE advertisements to broadcast data and the beacon protocols specify the payload in the BLE advertisements.

Figure 1:
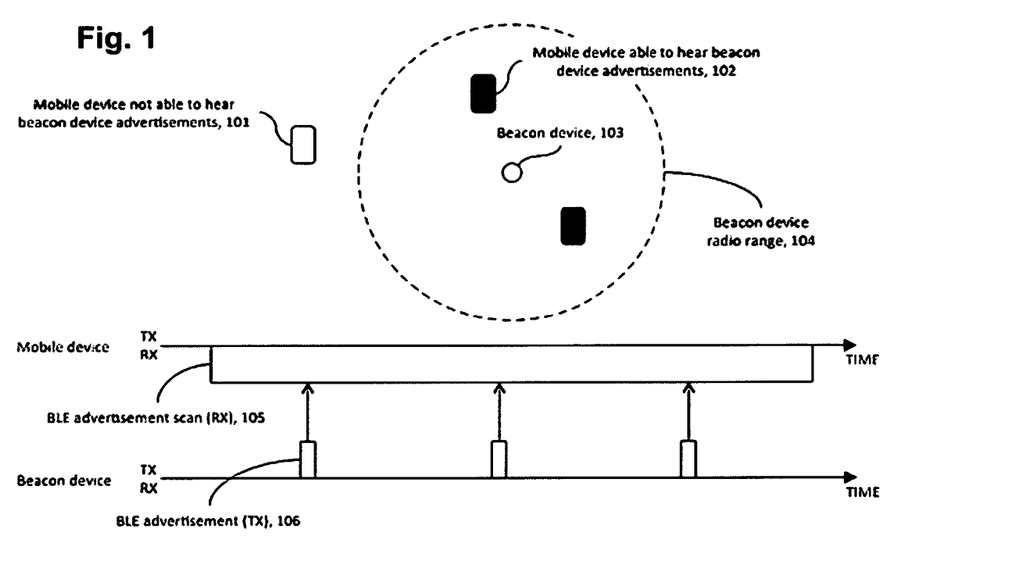
FIG. 1 presents an operation of beacon device.

FIG. 1 presents an example of beacon device operation. A beacon device 103 broadcasts BLE advertisements 106 periodically in one or multiple frequency channels. Mobile devices can attempt to receive the advertisements by scanning 105. In order to be able to receive the advertisements, a mobile device 102 needs to be inside the beacon device's radio range 104. A mobile device 101 outside of the radio range of the beacon device, cannot receive the advertisements.

Beacon devices have many different applications. Usually, in the envisioned applications, beacon devices are widely deployed in large quantities. Beacon devices have applications e.g. in retail, events, and transportation. In retail, beacon devices can be used e.g. for advertising, providing product information, and for contactless payment. In events, beacon devices can be used e.g. for communicating information and complementary content, and to promote sales. In transportation, beacon devices can be used e.g. for alerting travelers of delays and schedule changes, and reporting weather conditions.

Whilst there are multitude of envisioned applications for the beacon devices, there is no efficient way of connecting multiple beacon devices to an application system e.g. for management, status monitoring, and configuration purposes. To manage the beacon devices, there are currently three options: 1) configuration with a mobile device, 2) using end users' mobile devices as a gateway to an application system, or 3) adding extra gateway devices to enable connection between the beacon devices and an application system.

Figure 2:
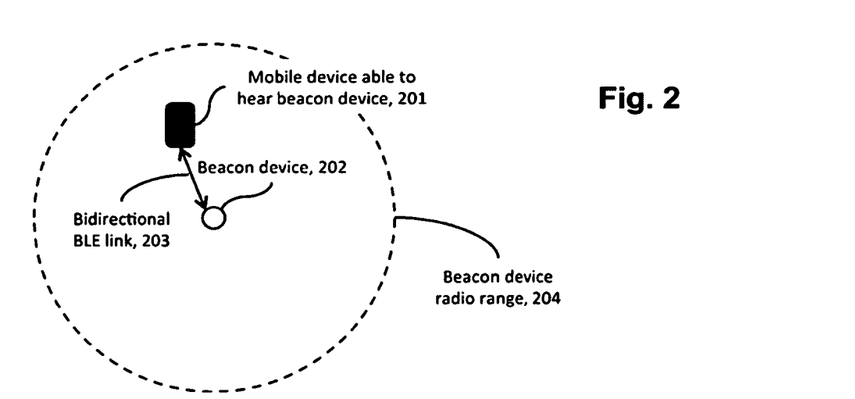
FIG. 2 presents how a beacon device is configured with a mobile device.

FIG. 2 presents an example of configuring a beacon device with a mobile device. When configuring with a mobile device 201, e.g. a smartphone, the user has to form a bi-directional connected BLE link 203 between the beacon device 202 and the mobile device 201. This means that the user has to be inside the radio range 204 of the beacon device. After the link 203 has been established, configuration can be done using an application in the mobile device 201. Usually the radio ranges of the beacon devices are in the scale of tens of meters. Thus, configuring large beacon installations requires lot of manual labor and increases maintenance cost of the system. In this scenario, remote management is not a possibility.

Another way of exploiting mobile devices is to use them as a gateway to an application system. The rationale in this method is that when the system is used, there are always end users' mobile devices nearby and they have connection both to the beacon devices and to an application system. However, this connectivity is intermittent and not guaranteed. There may be users in vicinity of some beacon devices at a specific time instant or then there may be not. The operator of the fleet of beacon devices cannot rely on this, as the infrastructure is it out of the operator's control. Also, in this scenario, the end user's data connection needs to be used for communication to the application system, which may be unacceptable for many end users.

Figure 3:
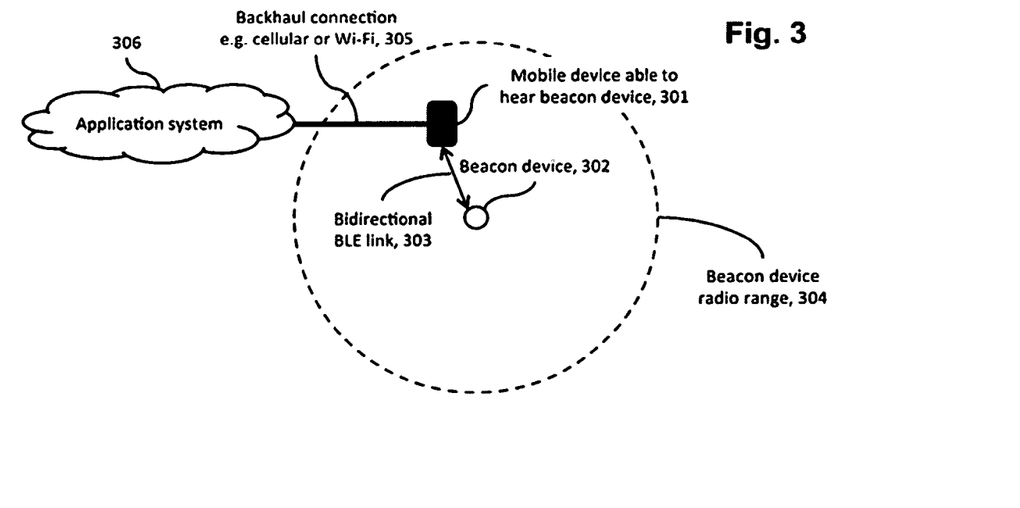
FIG. 3 presents how a beacon device is connected to an application system using a mobile device.

FIG. 3 presents an example of connecting a beacon device to an application system using a mobile device. A mobile device 301 has to be inside the radio range 304 of the beacon device 302 to form a connection. In order to provide communication to and from the beacon device 302, a bidirectional BLE link 303 has to be established between the mobile device 301 and the beacon device 302. The mobile device includes a backhaul connection 305 e.g. via cellular or Wi-Fi. A connection between an application system 306 and the beacon device 302 can be established by running software in the mobile device 301 that relays data between the two entities. This connection can be used for e.g. remotely configuring the beacon device 302.

By adding extra hardware acting as gateway between the beacon devices and an application system brings application system connectivity control to the operator and gives possibility for remotely managing the beacon devices. However, as BLE is a star topology, the amount of extra hardware needed (the gateways) scales up with the amount of beacon devices installed and with the geographical coverage of the beacon device installation. This increases the system cost significantly, especially in large installations.

Figure 4:
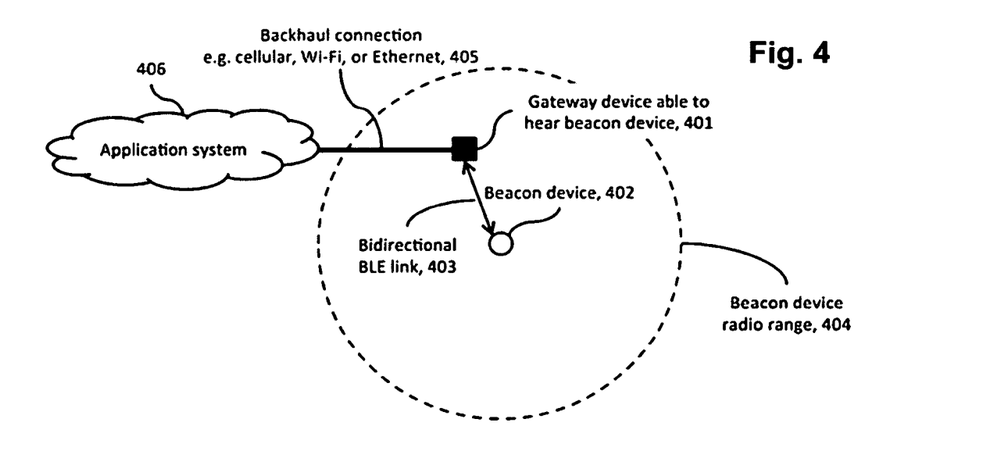
FIG. 4 presents how a beacon device is connected to an application system using an additional gateway device.

FIG. 4 presents an example of connecting a beacon device to an application system using an additional gateway device. A gateway device 401 has to be inside the radio range 404 of the beacon device 402 to form a connection. In order to provide communication to and from the beacon device 402, a bidirectional BLE link 403 has to be established between the gateway device 401 and the beacon device 402. The gateway device includes a backhaul connection 405 e.g. via cellular, Wi-Fi, or Ethernet. A connection between the application system 406 and the beacon device 402 can be established by running software in the gateway device 401 that relays data between the two entities. This connection can be used for e.g. remotely configuring the beacon device 402. The gateway device 401 has to include interfaces for both the backhaul connection 405 and BLE connection 403.

Figure 5A:
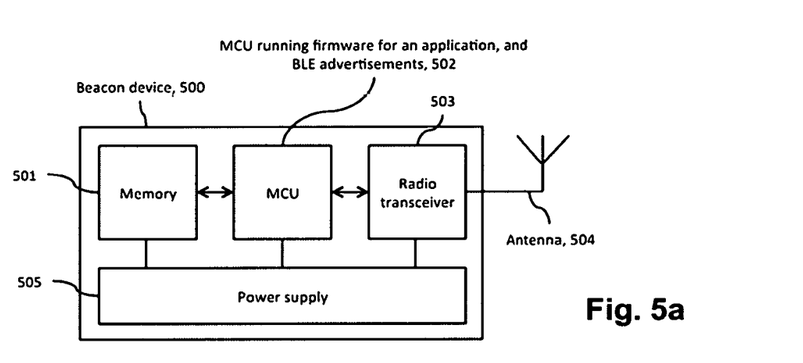
FIG. 5a presents a beacon device hardware architecture.

FIG. 5a illustrates an example of a beacon device hardware architecture. A beacon device 500 includes a memory 501, microcontroller unit (MCU) 502, a radio transceiver 503, antenna 504, and a power supply 505. The MCU 502 is used to run program code for a possible application and the BLE advertisement protocol. The radio transceiver 503 is used to transmit the BLE advertisements via the antenna 504. The power supply 505 includes components for powering the device, such a battery and a regulator.

Figure 5B:
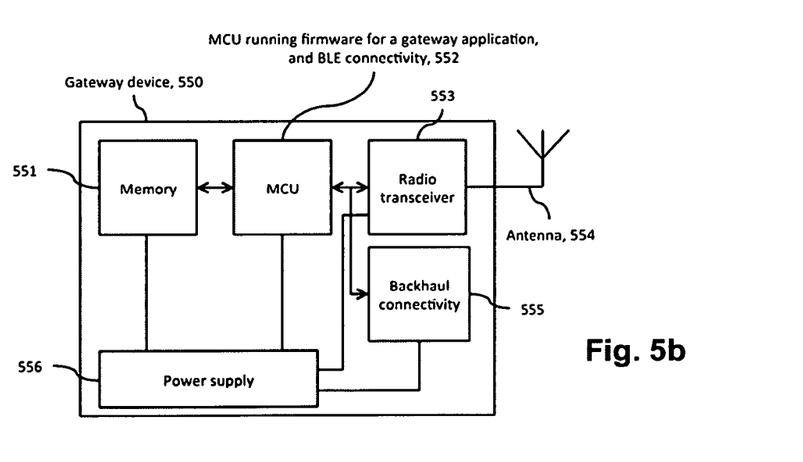
FIG. 5b presents a gateway device hardware architecture.

FIG. 5b presents an example of a gateway device hardware architecture. A gateway device 550 includes a memory 551, microcontroller unit (MCU) 552, a radio transceiver 553, antenna 554, backhaul connectivity 555, and a power supply 556. The MCU 552 is used to run program code for a gateway application and BLE connectivity protocol. The radio transceiver 553 and antenna 554 are used form bidirectional BLE links to beacon devices inside gateway device's radio range. The backhaul connectivity 555 is used to form bi-directional connection to the application system. The gateway application relays data between the application system and a beacon device using the backhaul connectivity and BLE connectivity. The power supply 555 includes components for powering the device. The gateway device may also implement the beacon advertisement functionality.

Wireless Mesh Network (WMN) is a general term for types of networks where devices can communicate with each other not only directly, but also indirectly over multiple hops using other nodes in the network for routing data between communicating endpoints. Other general terms also used on this types of networks include ad hoc networks, Wireless Sensor Networks (WSN), Wireless Sensor and Actuator Networks (WSAN), Low power and Lossy Networks (LLN). A WMN usually constitutes of multiple nodes devices, and one or multiple gateway devices. The gateway devices provide connection between the WMN and other networks, such as Internet. WMNs are characterized to be autonomous and low power. Usually, WMNs employ either a time-slotted or a contention-based channel access method at the link layer.

Figure 6:
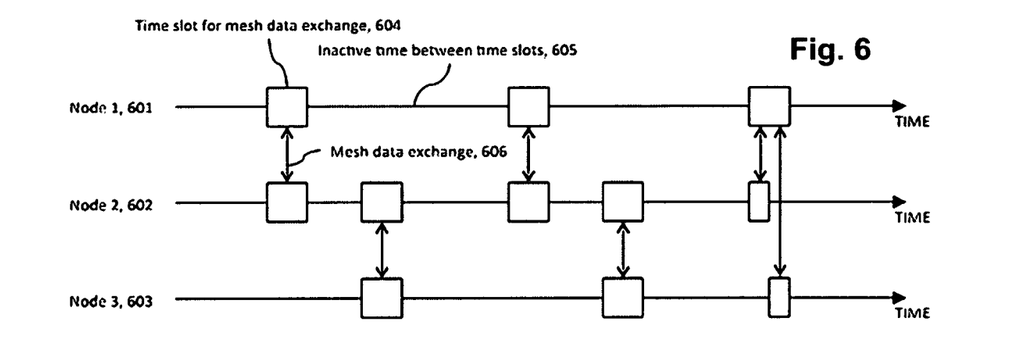
FIG. 6 presents a time-slotted WMN link layer operation.

FIG. 6 presents an example of time-slotted WMN link layer operation. The communicating nodes 601, 602, 603 use time slots 604 for exchanging data 606. The time slots are synchronized using a WMN protocol-specific signaling method. Time outside the synchronized time slots is inactive time 605 and e.g. the radio transceiver is not used. This time can be used e.g. to conserve energy by going to deep sleep mode resulting in low power operation.

Figure 7:
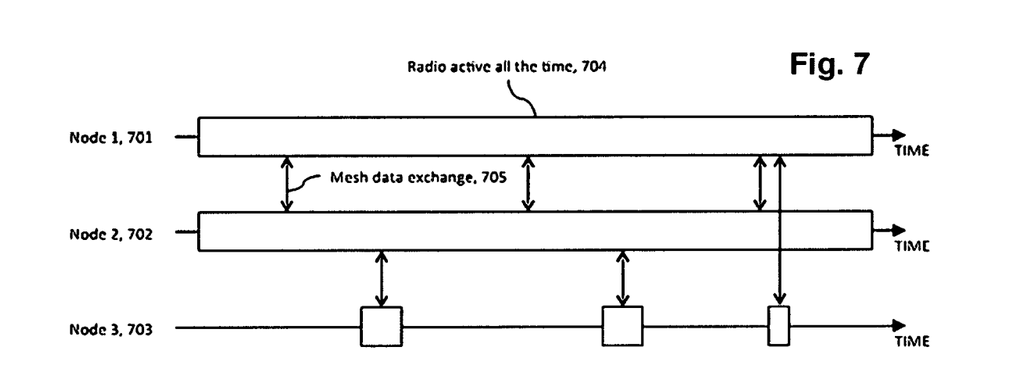
FIG. 7 presents a contention-based WMN link layer operation.

FIG. 7 illustrates an example of contention-based WMN link layer operation. For the devices that can route data 701, 702, the radio is active all the time 704 resulting in increased power consumption. If there is nothing to send the radio is kept in reception mode. This way, when another device has data to send, it can do it immediately 705. The specific method for accessing the channel is WMN protocol-specific and e.g. CSMA-CA or Aloha can be used. There may also be sleepy end nodes 703 that cannot route data, and can be inactive if nothing to send.

SUMMARY

One object of the invention is to withdraw the aforementioned drawbacks and to provide a system for efficiently connecting a beacon device and a gateway (GW) device and further to an application system.

One object of the invention is fulfilled by providing a system, a beacon device, method, computer program, and a computer-readable medium according to the independent claims.

One embodiment of the invention is a system for connecting a beacon device and a gateway device. The system comprising beacon devices and the gateway device. The beacon device belonging to the beacon devices is adapted to provide a bi-directional connection to the GW device and the GW device is adapted to provide a bi-directional connection to an application system. The beacon devices form a multi-hop wireless mesh network (WMN), the GW device provides a bidirectional mesh connection to the wire-less mesh network, and the wireless mesh network is used for communicating data between the beacon device and the GW device. The beacon devices multiplex the WMN and Bluetooth low energy (BLE) advertisement communications in time in order to use a single radio transceiver and a single antenna.

One embodiment of the invention is a beacon device to be connected to a gateway device. The beacon device comprising a microcontroller unit and a radio transceiver. The beacon device is adapted to provide, by the microcontroller unit and the radio transceiver, a bi-directional mesh connection between the beacon device and at least one other beacon device in order to form a multi-hop wireless mesh network (WMN) between the beacon device and the GW device by means of beacon devices, use, by the radio transceiver, the wireless mesh network for communicating data between the beacon device and the GW device and multiplex the WMN and Bluetooth low energy (BLE) advertisement communications in time in order to use a single radio transceiver and a single antenna. The beacon devices comprises the beacon device and the at least one other beacon device.

One embodiment of the invention is a method for connecting a beacon device to a gateway device. The beacon device comprising a microcontroller unit and a radio transceiver. The method comprising providing, by the microcontroller unit and the radio transceiver, a bi-directional mesh connection between the beacon device and at least one other beacon device in order to form a multi-hop wireless mesh network (WMN) between the beacon device and the GW device by means of beacon devices, using, by the radio transceiver, the wireless mesh network for communicating data between the beacon device and the GW device and multiplexing the WMN and Bluetooth low energy (BLE) advertisement communications in time in order to use a single radio transceiver and a single antenna. The beacon devices comprises the beacon device and the at least one other beacon device.

One embodiment of the invention is a computer program for connecting a beacon device to a gateway device, when the computer program is run in a computer. The beacon device comprising a microcontroller unit and a radio transceiver. The computer program comprising a connection code for providing, by the microcontroller unit, a bi-directional mesh connection between the beacon device and at least one other beacon device in order to form a multi-hop wireless mesh network between the beacon device and the GW device by means of beacon devices, and a communication code for using, by the radio transceiver, the wireless mesh network for communicating data between the beacon device and the GW device. The beacon devices comprises the beacon device and the at least one beacon device.

One embodiment of the invention is a is a tangible non-volatile computer readable medium comprising a computer program for connecting a beacon device to a gateway device, when the computer program is run in a computer. The beacon device comprising a microcontroller unit and a radio transceiver. The computer program comprising a connection code for providing, by the microcontroller unit, a bidirectional mesh connection between the beacon device and at least one other beacon device in order to form a multi-hop wireless mesh network between the beacon device and the GW device by means of beacon devices, and a communication code for using, by the radio transceiver, the wireless mesh network for communicating data between the beacon device and the GW device. The beacon devices comprises the beacon device and the at least one beacon device.

Further embodiments of the invention are defined in the dependent claims.

BRIEF DESCRIPTION OF THE FIGURES

The embodiments of the invention are presented with reference to the following figures.

DETAILED DESCRIPTION OF THE FIGURES

Figure 8:
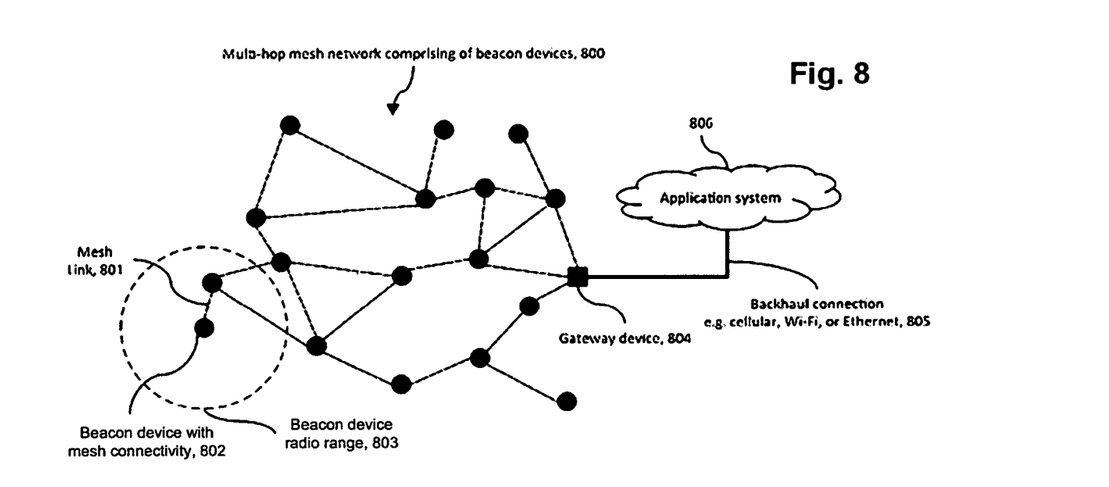
FIG. 8 presents how beacon devices are connected with each other, to a gateway, and to an application system using a WMN topology.

FIG. 8 presents a system and a method for connecting a beacon device 802 with each other, to a gateway (GW) device 804, and/or to an application system 806 using a WMN (topology) 800.

The system comprises a plurality of beacon devices 802 and the gateway device 804. Each beacon device 802 can provide a bi-directional connection 800, 801 to the gateway device 804. The gateway device 804 can provide a bi-directional connection 805 to an application system 806, e.g. a cloud system.

The beacon devices 802 are able to form a multi-hop WMN 800. In this, in addition to transmitting the BLE advertisements, each beacon device 802 is able to communicate with at least one other beacon device 802 inside its radio range 803 using a WMN protocol. Data can be relayed hop-by-hop between beacon devices outside of each other's radio range using the constructed mesh connection links 801 and mesh multi-hop routing. A gateway device 804 relays data between the mesh network 800 and an application system 806. The gateway device 804 has to include interfaces for both the backhaul connection 805 and the mesh connection 801. Due to the multi-hop communication small amount of gateway devices 804 are needed to provide application system connectivity to large amount of beacon devices 802.

This enables continuous visibility to the fleet of installed beacon devices and supports e.g. remote management, monitoring, and configuration of the beacon devices. Also, enhanced beacon security, providing protection against beacon spoofing and piggybacking attacks, is possible.

For a cost-efficient solution it is beneficial that the same transceiver hardware is used for both WMN communication and BLE advertisements. This enables the gateway and application system connectivity with minimal additional resources.

Figure 9A:
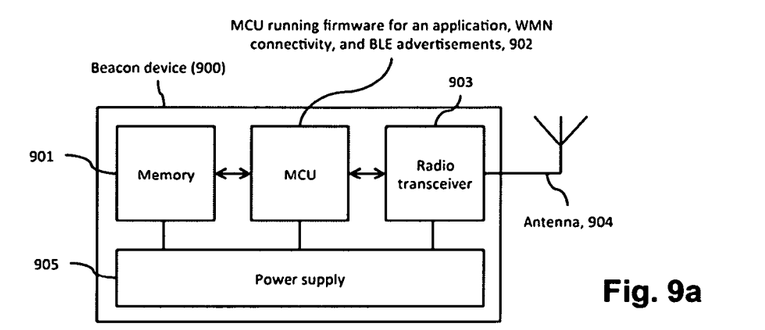
FIG. 9a presents a mesh-enabled beacon device hardware architecture.

FIG. 9a presents an example of a mesh-enabled beacon device hardware architecture. A mesh-enabled beacon device 900 includes a memory 901, microcontroller unit (MCU) 902, a radio transceiver 903, antenna 904, and a power supply 905. The MCU 902 is used to run computer program (code) for a possible application, WMN protocol, and the BLE advertisement protocol. The beacon device 900 uses radio transceiver 903 in order to transmit and receive mesh data between other beacon devices 900 and/or the gateway device, and to transmit the BLE advertisements via the antenna 904. The power supply 905 includes components for powering the device, such a battery and a regulator.

The memory 901 comprises the computer program, which is adapted to perform actions of the beacon device 900 presented in this detailed description part, when it is run in a computer, e.g. in the beacon device 900.

The computer program can be stored in a tangible non-volatile computer readable medium, e.g an USB stick or a CD-ROM disc.

Figure 9B:
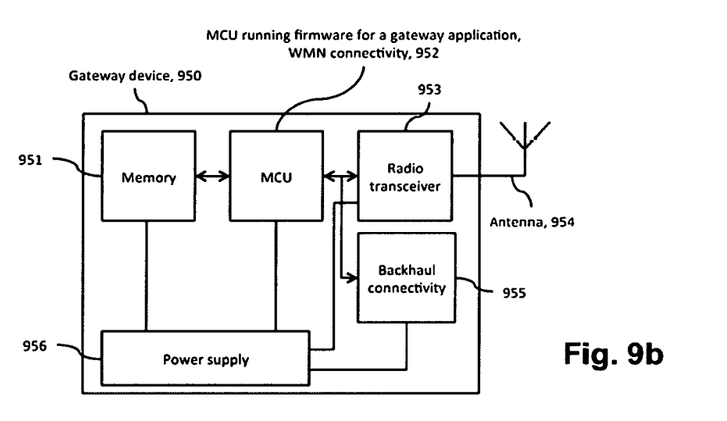
FIG. 9b presents a mesh-enabled gateway device hardware architecture.

FIG. 9b illustrates an example of a mesh-enabled gateway device hardware architecture. A gateway device 950 includes a memory 951, microcontroller unit (MCU) 952, a radio transceiver 953, antenna 954, backhaul connectivity 955, and a power supply 956. The MCU 952 is used to run computer program (code) for a gateway application and WMN connectivity protocol. The gateway device 950 uses the radio transceiver 953 and antenna 954 in order to form bi-directional WMN links (connection) to beacon devices inside gateway device's radio range. The backhaul connectivity 955 is used to form bi-directional connection to the application system. The gateway application relays data between the application system and a WMN formed by the beacon devices using the backhaul connectivity and WMN connectivity. The power supply 955 includes components for powering the device. The gateway device may also implement the beacon advertisement functionality similarly as a beacon device.

The memory 951 comprises the computer program, which is adapted to perform actions of the gateway device 950 presented in this detailed description part, when it is run in a computer, e.g. in the gateway device 950.

The computer program can be stored in a tangible non-volatile computer readable medium, e.g an USB stick or a CD-ROM disc.

The beacon device need to multiplex the mesh communication protocol and BLE advertisements in time in order to be able to use the same radio transceiver and antenna. This can be done both when using a time-slotted mesh link layer operation and when using a contention-based mesh link layer operation.

Figure 10:
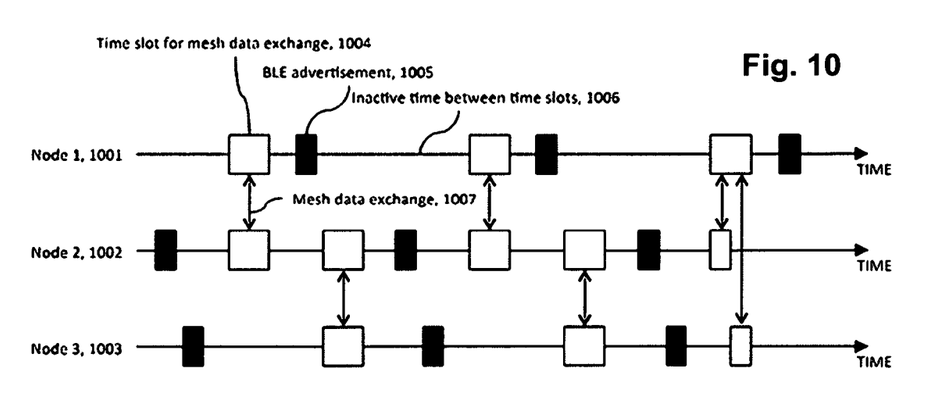
FIG. 10 presents how mesh functionality and BLE advertisement functionality can use the same radio transceiver and antenna when using a time-slotted WMN link layer operation.

FIG. 10 presents an example of how mesh functionality and BLE advertisement functionality can use the same radio transceiver and antenna of the beacon device when using a time-slotted WMN link layer operation. The communicating nodes 1001, 1002, 1003 use time slots 1004 for exchanging data 1007 during the time slots 1004. The time slots are synchronized using a WMN protocol-specific signaling method. Time outside the synchronized time slots is inactive time 1006 and e.g. the radio transceiver is not used. This time, i.e. when no WMN communication exists, can be used to send the BLE advertisements 1005 without interfering with the mesh communication. Time not used for mesh communication or BLE advertisements can be used e.g. to conserve energy by going to deep sleep mode. In the example, the WMN protocol has priority to use the shared hardware resources, e.g. the radio transceiver and antenna. Other types of priorities may also be implemented e.g. where the advertisement protocol has priority on the shared resources.

Figure 11:
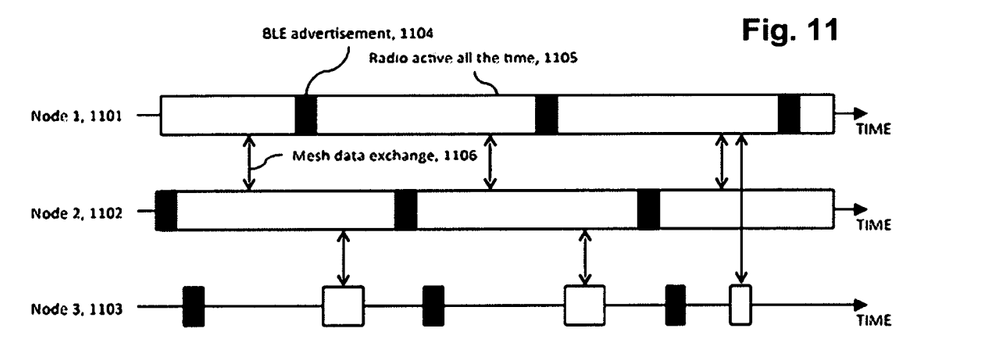
FIG. 11 presents how mesh functionality and BLE advertisement functionality can use the same radio transceiver and antenna when using a contention-based WMN link layer operation.

FIG. 11 presents an example of how mesh functionality and BLE advertisement functionality can use the same radio transceiver and antenna of the beacon device when using a contention-based WMN link layer operation. For the devices that can route data 1101, 1102, the radio is active all the time 1105. If there is nothing to send the radio kept in reception mode. This way, when another device has data to send, it can do it immediately 1106. The specific method for accessing the channel is WMN protocol-specific and e.g. CSMA-CA or Aloha can be used. To enable BLE advertisements 1104, the reception times of the mesh protocol have to interrupted. After the BLE advertisement(s) is sent, normal mesh protocol operation can be regained. If there are sleepy end nodes 1103 that cannot route data, the inactive times of the mesh protocol, i.e. when no WMN communication exists, can be used to send the BLE advertisements. In the example, the WMN protocol has priority to use the shared hardware resources, e.g. the radio transceiver and antenna. Other types of priorities may also be implemented e.g. where the advertisement protocol has priority on the shared resources.

The invention has been now explained above with reference to the aforementioned embodiments and the several advantages of the invention have been presented.

It is clear that the invention is not only restricted to these embodiments, but comprises all possible embodiments within the scope of the following claims.

The invention claimed is:

1. A system for connecting a beacon device and a gateway device, the system comprising:
   beacon devices; and
   the gateway (GW) device,
   wherein the beacon device belongs to the beacon devices and is configured to provide a bi-directional connection to the GW device,
   the GW device is configured to provide a bi-directional connection to an application system,
   the beacon devices form a multi-hop wireless mesh network (WMN) using a WMN communication protocol,
   the GW device provides a bi-directional mesh connection to the WMN,
   the WMN is used for communicating data between the beacon device and the GW device,
   the beacon devices multiplex the WMN communication protocol of the WMN and a Bluetooth low energy (BLE) advertisement communication protocol in time in order to use a same radio transceiver and a single antenna, and
   wherein the WMN communication protocol is a time-slotted or contention-based WMN communication protocol, and the beacon devices use the time-slotted or contention-based WMN communication protocol at a WMN link layer multiplexing with the BLE advertisement communication protocol.

2. The system of claim 1, wherein the beacon device provides a WMN connection link between the beacon device and at least one other beacon device, and uses the WMN communication protocol and the WMN connection link in order to communicate the data with the at least one other beacon device inside its radio-range.

3. The system of claim 2, wherein the data is relayed between the beacon devices outside the radio range of the beacon device by using mesh links between the beacon devices and mesh multi-hop routing.

4. The system of claim 3, wherein WMN communication between the beacon devices is provided during synchronized time slots in the time-slotted WMN communication protocol and when another beacon device has the data to send in the contention-based WMN communication protocol, and
   wherein the BLE advertisement communication is provided when no WMN communication exists in the time-slotted or contention-based WMN communication protocol.

5. The system of claim 1, wherein the data is relayed between the beacon devices outside the radio range of the beacon device by using mesh links between the beacon devices and mesh multi-hop routing.

6. The system of claim 1, wherein WMN communication between the beacon devices is provided during synchronized time slots in the time-slotted WMN communication protocol and when another beacon device has the data to send in the contention-based WMN communication protocol, and
   wherein the BLE advertisement communication is provided when no WMN communication exists in the time-slotted or contention-based WMN communication.

7. A beacon device configured to be connected to a gateway (GW) device, the beacon device comprising:
   a microcontroller; and
   a radio transceiver,
   wherein the beacon device is configured to:
      provide, by the microcontroller and the radio transceiver, a bi-directional mesh connection between the beacon device and at least one other beacon device in order to form a multi-hop wireless mesh network (WMN) between the beacon device and the GW device by beacon devices, and
      use, by the radio transceiver, the WMN for communicating data between the beacon device and the GW device,
   wherein the beacon devices comprise the beacon device and the at least one other beacon device,
   wherein the beacon device is configured to multiplex a WMN protocol of the WMN and a Bluetooth low energy (BLE) advertisement communication protocol in time in order to use a same radio transceiver and a single antenna, and
   wherein the WMN communication protocol is a time-slotted or contention-based WMN communication protocol, and the beacon devices use the time-slotted or contention-based WMN communication protocol at a WMN link layer multiplexing with the BLE advertisement communication protocol.

8. A method for connecting a beacon device to a gateway (GW) device, the beacon device including a microcontroller and a radio transceiver, the method comprising:
   providing, by the microcontroller and the radio transceiver, a bi-directional mesh connection between the beacon device and at least one other beacon device in order to form a multi-hop wireless mesh network (WMN) between the beacon device and the GW device by beacon devices comprising the beacon device and the at least one other beacon device;
   using, by the radio transceiver, the WMN for communicating data between the beacon device and the GW device; and
   multiplexing a WMN protocol of the WMN and a Bluetooth low energy (BLE) advertisement communication protocol in time in order to use a same radio transceiver and a single antenna,
   wherein the WMN communication protocol is a time-slotted or contention-based WMN communication protocol, and the beacon devices use the time-slotted or contention-based WMN communication protocol at a WMN link layer multiplexing with the BLE advertisement communication protocol.

9. A non-transitory, computer readable medium comprising a computer program configured to perform the method of claim 8, when run in a computer.

* * * * *